(No Model.)
2 Sheets—Sheet 1.
T. J. THORP.
BICYCLE.
No. 436,844.
Patented Sept. 23, 1890.
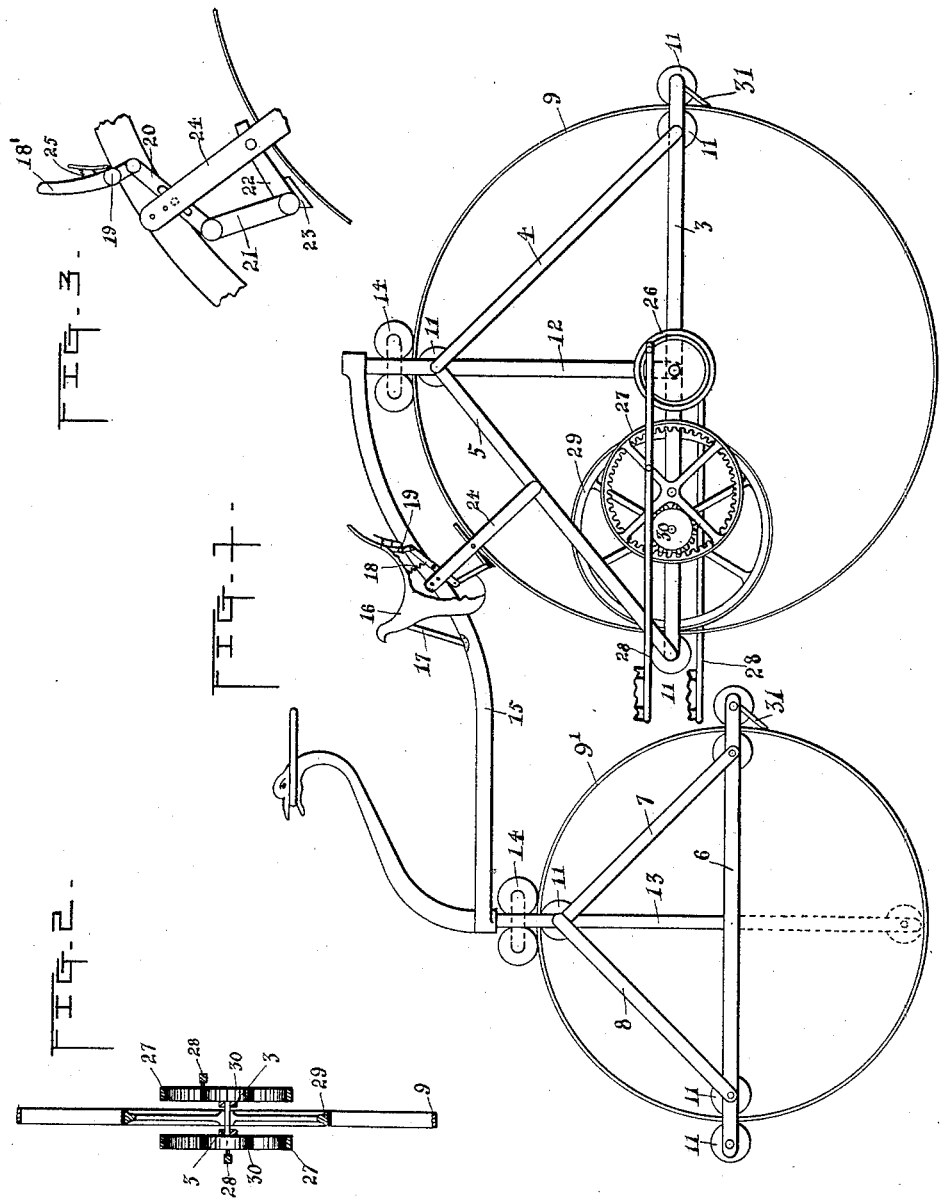
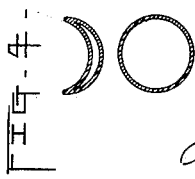
Witnesses
C. J. Cross
B. M. Parsons
Inventor
Thomas J. Thorp (No Model.) 2 Sheets—Sheet 2.
T. J. THORP.
BICYCLE.
No. 436,844. Patented Sept. 23, 1890.
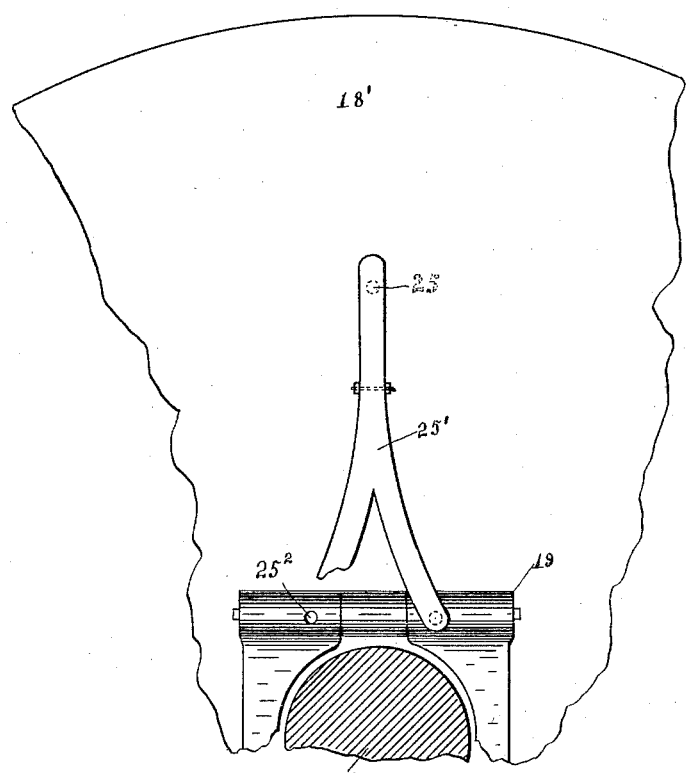
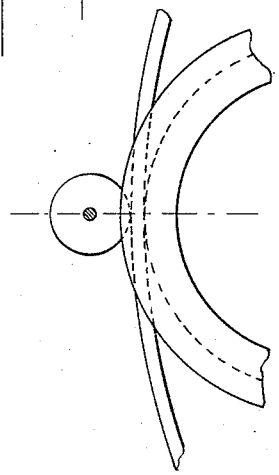
Witnesses
Archie M. Catlin
E. R. Conner
Inventor
Thomas J. Thorp
By his Attorney
Benj. R. Catlin

UNITED STATES PATENT OFFICE.

THOMAS J. THORP, OF CHICAGO, ILLINOIS, ASSIGNOR OF ONE-HALF TO L. H. CRARY, OF CLEVELAND, OHIO.

BICYCLE.

SPECIFICATION forming part of Letters Patent No. 436,844, dated September 23, 1890.

Application filed May 16, 1890. Serial No. 352,044. (No model.)

*To all whom it may concern:*

Be it known that I, THOMAS J. THORP, a citizen of the United States, residing at Chicago, in the county of Cook and State of Illinois, have invented certain new and useful Improvements in Bicycles; and I do hereby declare the following to be a full, clear, and exact description of the invention, such as will enable others skilled in the art to which it appertains to make and use the same.

The object of the invention is to provide an improved bicycle having certain novel features of construction; and it consists in the matters hereinafter described, and particularly pointed out in the claims.

In the accompanying drawings, Figure 1 is a side elevation of a bicycle embodying the invention. Fig. 2 is a section on line $x$ $x$ of Fig. 1, certain parts being omitted. Fig. 3 is a detail showing the construction of the braking device, and Fig. 4 is a section of modified wheel-rims. Fig. 5 is a rear elevation of the seat, partly broken away; and Figs. 6 and 7 are respectively side and sectional views of details.

Numerals 1 and 2 denote the bicycle-wheels, each having two interiorly-arranged triangular frames, composed of the bars 3, 4, and 5 in one case and of bars 6, 7, and 8 in the other. These bars are arranged in parallel pairs, one only of each pair being shown in the elevation. The horizontal bars 3 in one case or 6 in the other extend beyond the rim 9 or 9' of the respective wheels and support between them, both on the outside and on the inside of said rim, wheels 11, which bear against the rim on opposite sides thereof. Posts 12 and 13 are secured to the middle of the horizontal frame-bars 3 and 6 and are connected to the vertices of the triangular frames and extended beyond the top of the wheel-rims. At or near the junction of the posts and bars are pivoted wheels 11, which bear on the inside of the respective wheel-rims, and upon the opposite side of the rims are journaled in each case a pair of wheels 14, which bear upon the rims at one side of the line of bearing of a wheel 11. These several wheels may be made of elastic material or provided with elastic peripheries, as may also the main wheels 1 and 2. The arrangement of the two wheels 14 is such that the bearing strain is distributed on the wheel-rims. The upper ends of the posts 12 and 13 are connected by seat-bar 15, upon which is mounted a seat 16.

17 is a brace or post for the seat, and 18 a spring. The back 18' is pivoted at 19, and at its foot has a pivoted connection with a pivoted lever 20. The latter is connected by link 21 with a brake-bar 22.

23 is the brake, and 24 is a post or bar connecting the bar 5 with the seat-bar, as indicated.

25 indicates a spring, which normally holds the lower forked end of a lever 25' in engagement with holes $25^2$, formed in the hinge or elsewhere. In mounting, the spring 25 may be compressed and the lever-pins disengaged from holes $25^2$, so that the cantle of the saddle can be thrown back until the rider has taken his seat, whereupon it is raised to a working position and can be operated to apply the brake by leaning back.

The bicycle is propelled by the following mechanism: 26 and 27 are crank-wheels, there being two of each, journaled in the horizontal bar 3. Treadle-levers are indicated by 28, by which these crank-wheels are rotated. Each wheel 27 has an internal gear meshing with a pinion 30. Rigidly connected to the common axis of these pinions is a wheel 29, which bears upon the interior of rim 9 immediately opposite a wheel 11 on the end of bar 3. The wheel is provided with a groove to receive the main wheel-rim and also the wheels 11, as indicated in Figs. 6 and 7, whereby the parts are kept in proper lateral relation to each other.

The bicycle is propelled by the treadles which revolve the crank-wheels and pinion and driving-wheel 29, the latter communicating motion by friction.

31 are mud-guards, supported from bars 3 just below a wheel 11.

The wheel-rims are made sufficiently strong to prevent undue bending or springing. They are supported by the frames and by the several wheels that bear on their interior and exterior, the thrust of the several frame-bars always resisting any tendency to collapse. The weight of the rider is transmitted through bar 15 and wheels 14 to the frame and to its vertical and inclined bars in such manner as to distribute the pressure to the interior of the wheel-rims. These latter can be made in any approved form and tubular, if desired, substantially as indicated in Fig. 4, whereby their rigidity is increased with a given weight of material. Other mechanical changes can be made without departing from the invention—as, for example, more bars and wheels bearing upon the rims may be employed, and wheels 14 can be spread farther apart, and the relative size of these wheels and also of wheels 11 can be varied, and a vertical post and wheel below the horizontal bar, as indicated in dotted lines in Fig. 1, can be used.

Having thus described my invention, what I desire to secure by Letters Patent is—

1. In a bicycle, a wheel-rim, in combination with an interior supporting-frame provided with wheels bearing on the interior of the rim and also on their exterior and opposite to the inner wheels, said frame having posts extended above the wheel and attached to the seat-bar and having a brace connected with said bar near the seat, substantially as set forth.

2. In a bicycle, an interior frame provided with wheels bearing on the main wheel-rim, said frame having vertical posts radially arranged and supporting a wheel against both the interior and the exterior of the rim, said posts being extended above the rim and attached to and supporting one end of the seat-bar, and said seat-bar, substantially as set forth.

3. In combination, in a bicycle, two main wheels, each having an interior supporting-frame, the seat supported upon posts extending from said interior frames to points above the respective wheels, and treadle-levers supported in the frame of the rear wheel and extending to a point between the wheels, substantially as set forth.

4. In a bicycle, an interior frame provided with wheels bearing on the main wheel-rim, said frame having a vertical post radially arranged and supporting a wheel against both the interior and exterior of the rim, the exterior wheels being arranged in pairs, substantially as set forth.

5. In a bicycle, two wheels, each provided with an interior frame loosely connected with the wheel-rim, the crank-wheels journaled in one of said frames, the pinions, the frictional driving-wheel, the treadles, and the seat-bar connecting the frames above the wheels, all in combination, substantially as set forth.

6. In a bicycle, a seat having a pivoted back, a brake, and connecting-levers, in combination, substantially as set forth.

7. In a bicycle, an interior frame and supporting-wheels bearing on the exterior of the rim, in combination with a mud-guard located below said wheel, substantially as set forth.

In testimony whereof I affix my signature in presence of two witnesses.

THOMAS J. THORP.

Witnesses:
ADA CRARY,
EMILY R. CRARY.